United States Patent [19]
Miyake et al.

[11] Patent Number: 5,524,067
[45] Date of Patent: Jun. 4, 1996

[54] IMAGE PROCESSING DEVICE EMPLOYING CODING WITH EDGE INFORMATION PRESERVED

[75] Inventors: Hidetaka Miyake, Kanagawa; Toshi Minami; Osamu Nakamura, both of Tokyo, all of Japan

[73] Assignee: Fuji Xerox Co., Ltd., Tokyo, Japan

[21] Appl. No.: 466,237

[22] Filed: Jun. 6, 1995

Related U.S. Application Data

[63] Continuation of Ser. No. 131,621, Oct. 5, 1993, abandoned.

[30] Foreign Application Priority Data

Oct. 6, 1992 [JP] Japan .................................. 4-290964

[51] Int. Cl.$^6$ ............................ G06K 9/36; G06K 9/46; H04N 7/12; H04N 1/417
[52] U.S. Cl. ................... 382/234; 382/238; 382/239; 382/304; 348/397; 358/430; 358/467
[58] Field of Search ............................ 382/234, 238, 382/239, 304; 348/394, 397, 409; 358/430, 433, 261.1, 261.2, 261.3, 462, 467

[56] References Cited

U.S. PATENT DOCUMENTS

| | | | |
|---|---|---|---|
| 4,511,213 | 4/1985 | Yamazaki et al. | 358/433 |
| 4,788,598 | 11/1988 | Ochi et al. | 358/429 |
| 4,922,349 | 5/1990 | Abe et al. | 358/433 |
| 5,157,743 | 10/1992 | Maeda et al. | 348/403 |

OTHER PUBLICATIONS

"Low bit rate coding of high definition images for the digital copying machine", Iizuka et al., Proc. of PCSJ90, pp. 113–116, Oct. 1990.
"A Study of High Definition Image Coding Scheme Based on Arithmetic Approximation", Iizuka et al., Proc. of PCSJ91, pp. 183–186, Oct. 1991.

*Primary Examiner*—Jose L. Couso
*Assistant Examiner*—Matthew C. Bella
*Attorney, Agent, or Firm*—Finnegan, Henderson, Farabow, Garrett & Dunner

[57] ABSTRACT

An image processing device including a blocking section for dividing an input image into a plurality of blocks each consisting of N1×N2 (N1, N2: positive integers) picture elements; a block attribute determining section for determining an attribute of each block, the attribute being defined as one of a flat portion having substantially no density variation in each block, a semi-flat portion having a binary density distribution in each block, and an edge portion having a steep density variation in each block; a first coding section for coding each block of the flat portion; a second coding section for coding each block of the semi-flat portion; a third coding section for predictively coding the picture elements in each block of the edge portion; a fourth coding section for coding the attribute determined by the block attribute determining section; and a code assembling section for assembling codes obtained by the first to fourth coding sections. Accordingly, an image quality, compression rate, processing time, etc. can be further improved.

6 Claims, 7 Drawing Sheets

| DENSITY | TYPICAL VALUE | CODE LENGTH |
|---|---|---|
| -73 OR LESS | -80 | 11 |
| -72 ~ -58 | -64 | 11 |
| -57 ~ -43 | -50 | 11 |
| -42 ~ -30 | -35 | 11 |
| -29 ~ -19 | -23 | 8 |
| -18 ~ -10 | -14 | 8 |
| -9 ~ -3 | -5 | 4 |
| -7 ~ 2 | 0 | 1 |
| 3 ~ 9 | 6 | 2 |
| 10 ~ 18 | 14 | 7 |
| 19 ~ 29 | 23 | 3 |
| 30 ~ 42 | 35 | 5 |
| 43 ~ 57 | 50 | 7 |
| 58 ~ 71 | 64 | 9 |
| 72 OR MORE | 80 | 8 |

IMAGE PROCESSING DEVICE EMPLOYING CODING WITH EDGE INFORMATION PRESERVED

This application is a continuation of application Ser. No. 08/131,621 filed Oct. 5, 1993, now abandoned.

BACKGROUND OF THE INVENTION

1. Field of the Invention

The present invention relates to an image processing device for efficiently compressing image information, and more particularly to an image processing device for performing high-efficiency coding of a continuous-tone character image.

2. Description of the Related Art

An image is a kind of information that can be grasped intuitively and entirely, and communication using the image is widely spread as means having a high function of information transfer. However, because of the fact that image information is generally very large in information content, a cost and a processing time for transfer of image information become large if the image information in the original form is transmitted through a communication network to a remote site, or is accumulated into various electronic media. To cope with this problem, it is necessary to use a high-efficiency coding method for efficiently compressing the image information and transmitting or accumulating the compressed information.

As such a high-efficiency coding method known are a predicative coding method, block coding method (BTC: Block Truncation Coding), orthogonal transform coding method, vector quantization method, and entropy coding method.

However, such various high-efficiency coding methods conventionally proposed have their merits and demerits depending on the property of a subject document image, and are insufficient in coding a document image containing characters, line drawings, halftone image, etc. in combination.

To solve this problem, the present inventors have proposed in Japanese Patent Laid-open Publication No. 4-144485 an image processing device which can hold a high image quality, highly compress image information, and code/decode the image information in a short processing time.

In this image processing device previously proposed by the present inventors, an input image is divided into a character area and a halftone area. The character area is further divided into a plurality of blocks, and each block is coded by a coding method adaptable to the statistical property of the character area. On the other hand, the halftone area is also coded by a coding method adaptable to the statistical property of the halftone area.

SUMMARY OF THE INVENTION

It is accordingly an object of the present invention to provide an image processing device which can further improve an image quality, compression rate, processing time, etc. by the improvement in character area coding technique.

According to the present invention, there is provided an image processing device comprising blocking means for dividing an input image into a plurality of blocks each consisting of N1×N2 (N1, N2: positive integers) picture elements; block attribute determining means for determining an attribute of each of said blocks obtained by said blocking means, said attribute being defined as one of a flat portion having substantially no density variation in said each block, a semi-flat portion having a binary density distribution in said each block, and an edge portion having a steep density variation in said each block; first coding means for coding said each block by one-tone block approximation when said attribute is determined as said flat portion by said block attribute determining means; second coding means for coding said each block by two-tone block approximation when said attribute is determined as said semi-flat portion by said block attribute determining means; third coding means for coding said each block by prediction of densities of said picture elements when said attribute is determined as said edge portion by said block attribute determining means; fourth coding means for coding said attribute determined by said block attribute determining means; and code assembling means for assembling codes obtained by said first, second, third, and fourth coding means.

The third coding means preferably performs adaptive predictive coding by detecting an edge direction and selecting one of said picture elements to be used for said prediction according to said edge direction detected above.

The fourth coding means preferably comprises means for converting ternary block attribute information into binary information by monitoring a change of said ternary block attribute information and by representing said change by said binary information; and means for compressing and coding said binary information.

An input image is divided into a plurality of blocks each consisting of N1×N2 picture elements by the blocking means. The attribute of each block, i.e., one of the flat portion, the semi-flat portion, and the edge portion, is determined by the block attribute determining means. Each block is coded by a coding method suitable for the attribute determined above. Specifically, when the attribute of each block is determined as the flat portion, one-tone block truncation coding is performed on the flat portion by the first coding means. When the attribute of each block is determined as the semi-flat portion, two-tone block truncation coding is performed on the semi-flat portion by the second coding means. When the attribute of each block is determined as the edge portion, predictive coding of the density of each picture element is performed on the edge portion by the third coding means. The block attribute information as information for instructing a decoding method in the subsequent decoding process is coded by the fourth coding means. The codes output from the first to fourth coding means are assembled by the code assembling means and then output therefrom.

Thus, the three kinds of coding methods are adaptively selected according to a local density distribution in each block divided from the input image, thereby holding an image quality higher than that in the prior art and effecting high compression of data.

In the predictive coding of the edge portion, an edge direction is detected and a predictive picture element is decided. Accordingly, the accuracy of prediction can be improved, and a predictive error can be reduced.

In the coding of the block attribute information, ternary block attribute information is converted into binary information, and a compressive coding method for a binary image is applied to the binary information converted above. Accordingly, high compression of the block attribute information can be effected.

Other objects and features of the invention will be more fully understood from the following detailed description and appended claims when taken with the accompanying drawings.

DETAILED DESCRIPTION OF THE PREFERRED EMBODIMENTS

Figure 2:
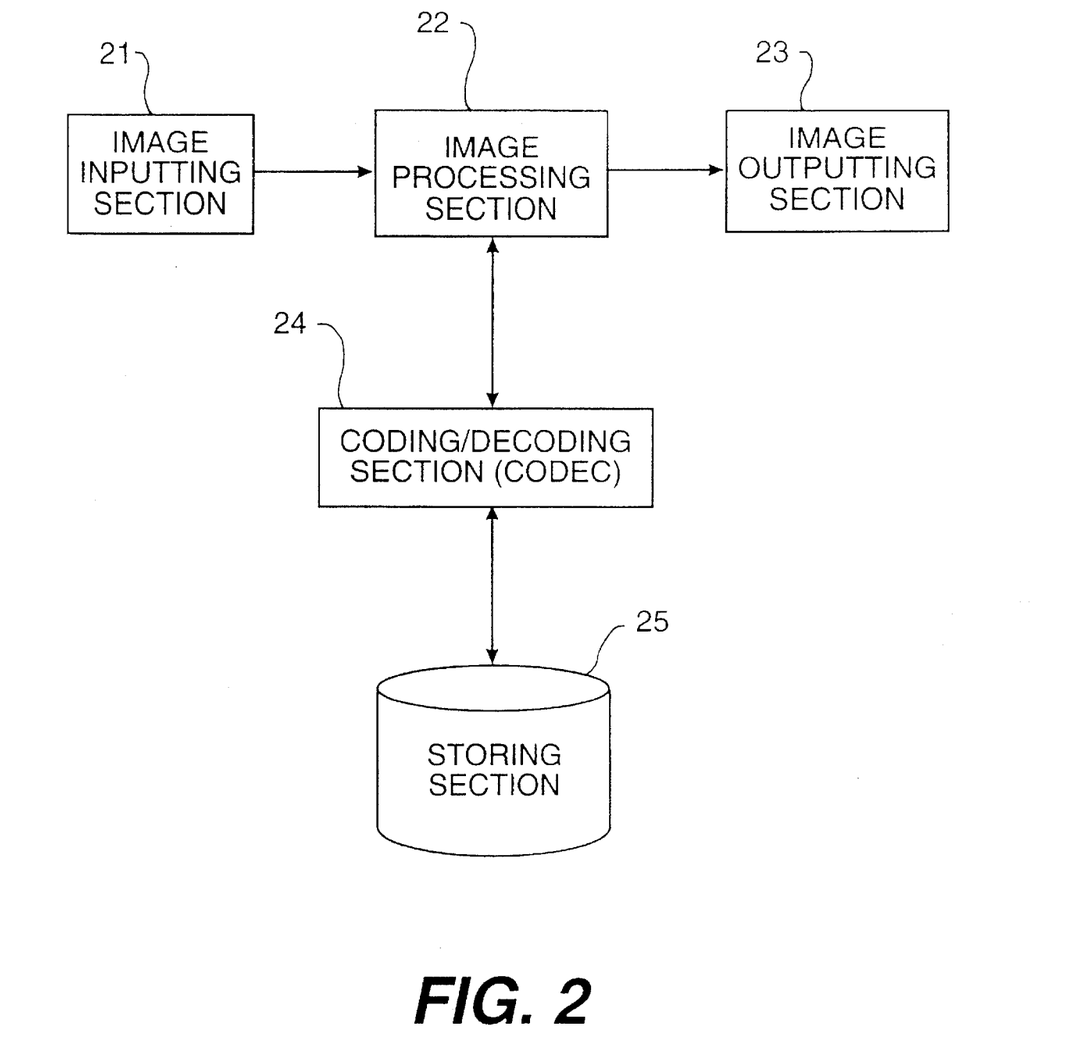
FIG. 2 is a schematic block diagram of the image processing device according to the preferred embodiment.

Referring to FIG. 2, there is shown a schematic construction of an image processing device according to a preferred embodiment of the present invention applied to a digital copying machine. The image processing device shown in FIG. 2 includes an image inputting section 21 such as an image scanner, an image processing section 22 for performing image processing such as image transforming and editing, an image outputting section 23 such as a printer, a coding/decoding section (CODEC) 24 for performing high-efficiency coding with image compression or performing decoding by reverse processing, and a storing section 25 for storing the image coded.

Figure 1:
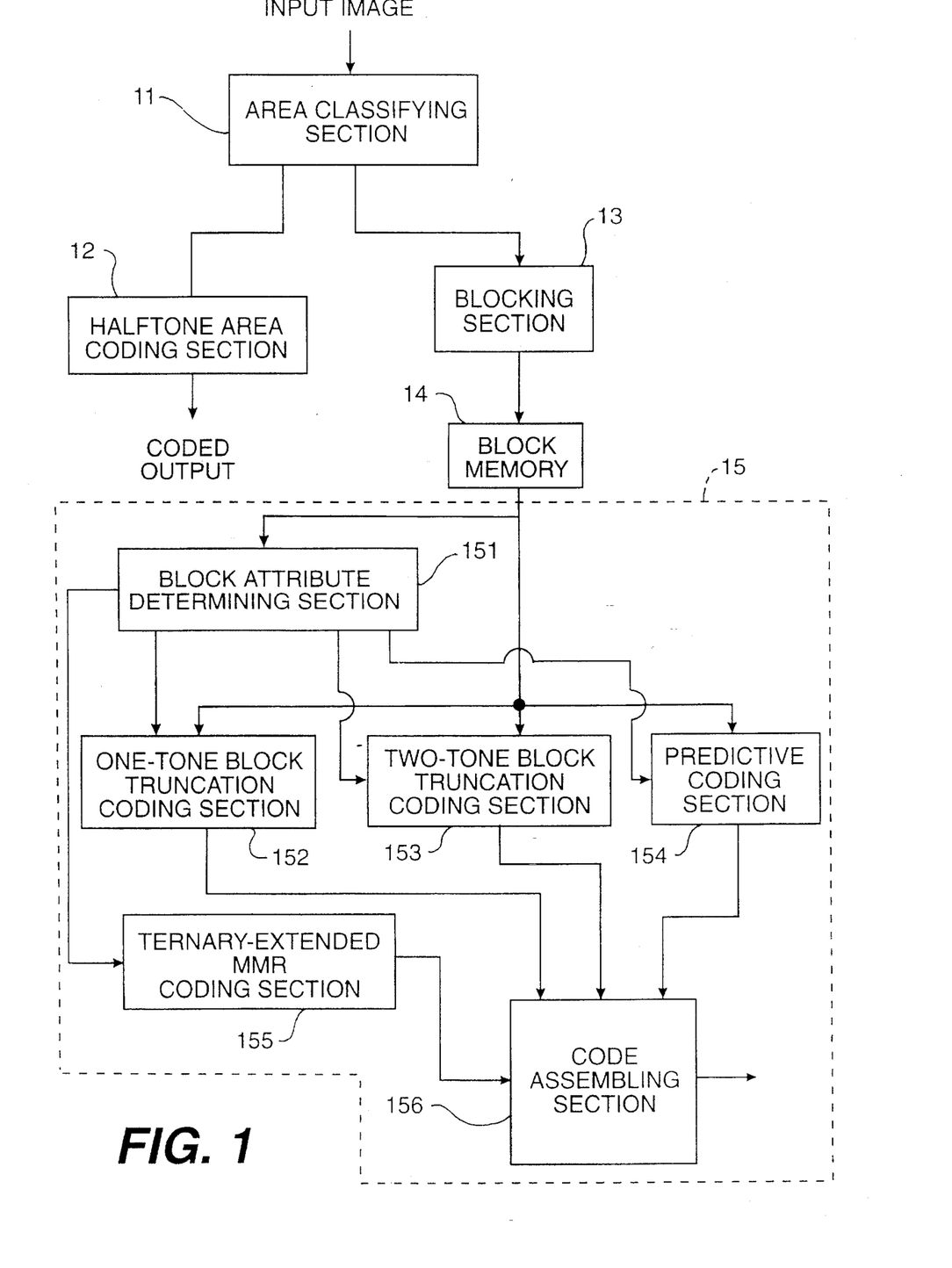
FIG. 1 is a block diagram of a coding section in a preferred embodiment of the present invention.

Referring to FIG. 1, there is shown a construction of a part for performing the high-efficiency coding. This part includes an area classifying section 11 for classifying an input image into a character area including characters, figures, etc. and a halftone area including photographs, etc., a halftone area coding section 12 for coding the halftone area obtained by the area classifying section 11, a blocking section 13 for dividing the input image into a plurality of blocks each consisting of N1×N2 (N1, N2: positive integers) picture elements, a block memory 14 for storing the blocks obtained by the blocking section 13, and a character area coding section 15 for coding the character area obtained by the area classifying section 11. The area classifying section 11 and the blocking section 13 belong to the function of the image processing section 22 shown in FIG. 2, and the character area coding section 15 and the halftone area coding section 12 belong to the function of the coding/decoding section 24 shown in FIG. 2.

A document image input from the image inputting section 21 is separated by the area classifying section 11 into a character area including characters, graphs, line drawings, etc. and a halftone area including figures, photographs, etc. that show a density gradient with use of halftone dots or dither. The separation of the input image may be automatically performed by utilizing the property of the image or by instruction of an operator.

While the blocking section 13 divides the character area into the blocks each consisting of N1×N2 picture elements, each block is set to 4×4 picture elements in this preferred embodiment.

Each block is subjected to the high-efficiency coding by the character area coding section 15, and is then stored into the storing section 25.

The character area coding section 15 will now be described in detail.

The character area coding section 15 includes a block attribute determining section 151 for examining a density variation of the image in the block, examining a density distribution of the block, determining an attribute of the block, and labeling the block; a one-tone block truncation coding section (one-tone BTC) 152 to be used for coding of the block when the block belongs to a portion where the density variation is very flat (a flat portion; Label (1)); a two-tone block truncation coding section (two-tone BTC) 153 to be used for coding of the block when the block belongs to a portion where the density variation is relatively gentle (a semi-flat portion; Label (2)); a predictive coding section 154 for performing predictive coding of the block when the block belongs to a portion where the density variation is steep (an edge portion; Label (3)); a ternary-extended MMR coding section 155 for coding block attribute information (label) obtained by the block attribute determining section 151; and a code assembling section 156 for assembling the codes output from the coding sections 152 to 155.

The operation of the character area coding section 15 will now be described.

The blocks of the character area stored in the block memory 14 are subjected to determination of block attribute (label) by the block attribute determining section 151.

Figure 3:
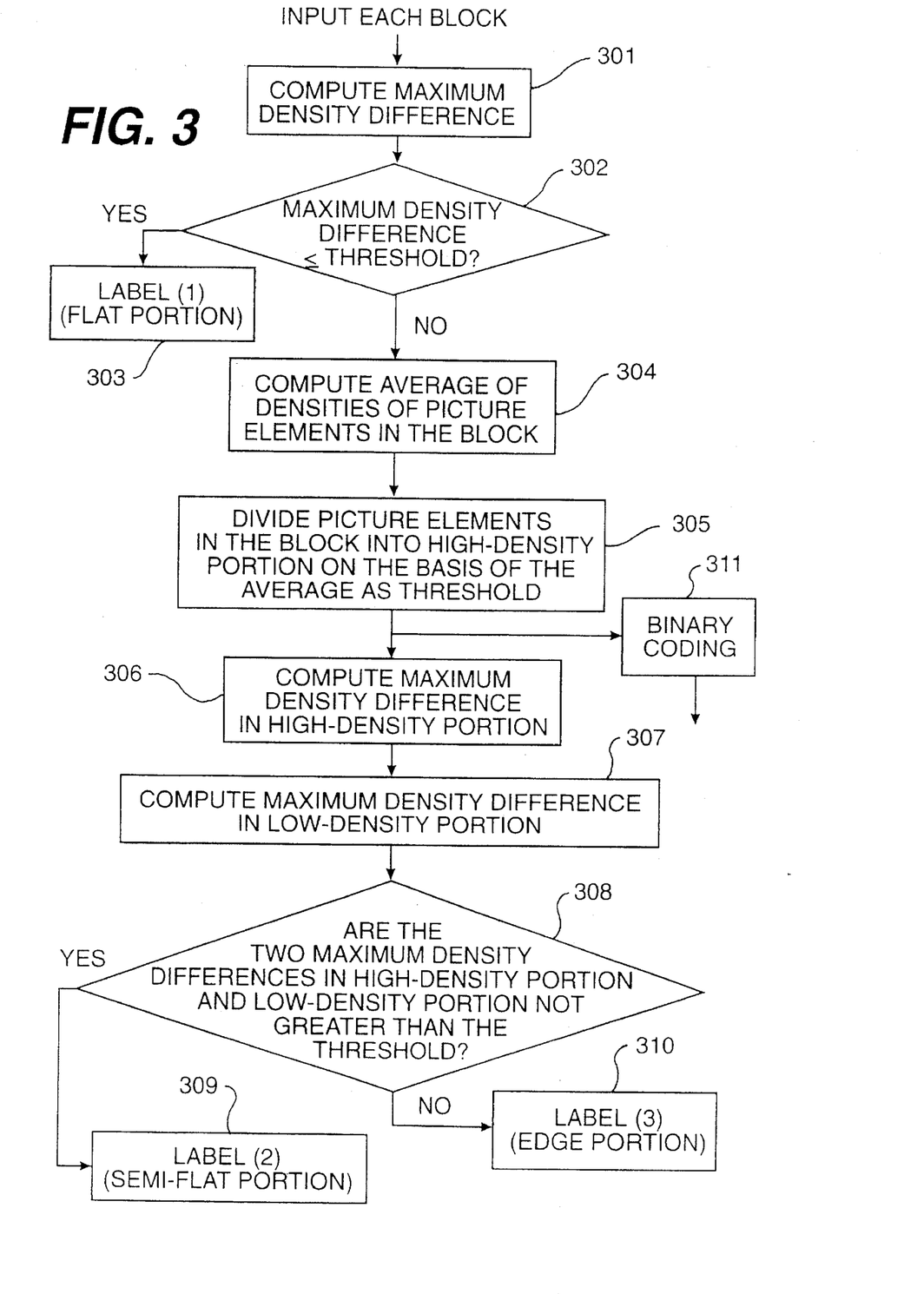
FIG. 3 is a flowchart of the operation of a block attribute determining section shown in FIG. 1.

Referring to FIG. 3, there is shown a schematic flow of the processing to be executed by the block attribute determining section 151.

First, the density of the densest one of the picture elements in each block and the density of the thinnest one of the picture elements in each block are obtained, and the difference between the two densities obtained above (maximum density difference) is computed (step 301).

Then, it is checked whether the maximum density difference computed above is not greater than a predetermined threshold (step 302).

If the maximum density difference is not greater than the predetermined threshold, it is determined that the attribute of the block is the flat portion corresponding to Label (1) (step 303).

If the maximum density difference is greater than the predetermined threshold, an average of the densities of all the picture elements in the block is computed (step 304).

Then, the density of each picture element in the block is compared with the average computed above as a threshold. On the basis of the result of comparison, all the picture elements in the block are classified into a high-density portion and a low-density portion (step 305).

Then, a maximum density difference in the high-density portion is computed (step 306), and a maximum density difference in the low-density portion (step 307) is computed (step 307). In other words, the difference in density between the densest picture element and the thinnest picture element belonging to the high-density portion is obtained, and the difference in density between the densest picture element and the thinnest picture element belonging to the low-density portion is obtained.

Then, it is checked whether the two maximum density differences in the high-density portion and the low-density portion computed above are not greater than the predetermined threshold (step 308).

If the two maximum density differences in the high-density portion and the low-density portion are not greater than the predetermined threshold, it is determined that the attribute of the block is the semi-flat portion corresponding to Label (2) (step 309).

If at least one of the two maximum density differences in the high-density portion and the low-density portion is greater than the predetermined threshold, it is determined that the attribute of the block is the edge portion corresponding to Label (3) (step 310).

Figure 4:
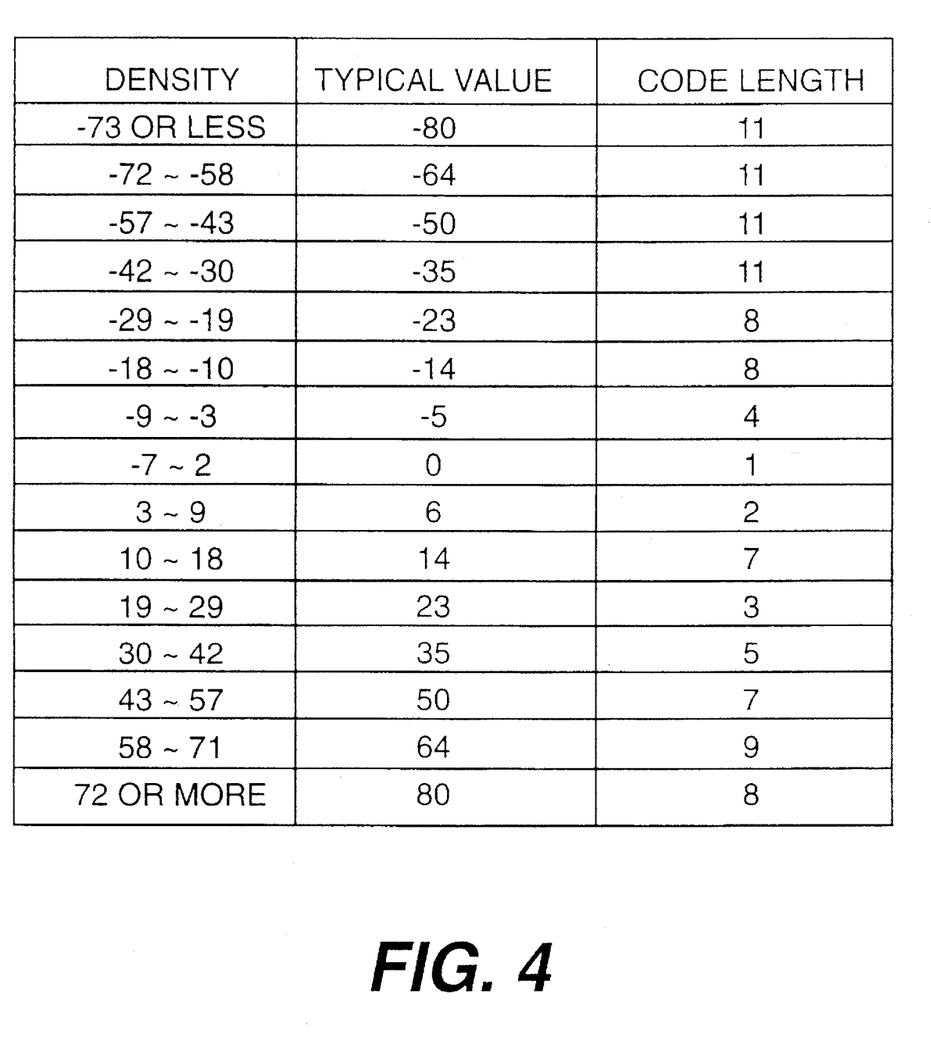
FIG. 4 is an exemplary quantization table to be used in the preferred embodiment.

When the attribute of the block is determined to be Label (1) in the block attribute determining section 151, the block is the flat portion where the density variation in the block is flat. From this statistical property, one-tone approximation is applied to the block. That is, an average of the densities of all the picture elements in the block is approximated to a single tone in the block by the one-tone block truncation coding section 152. In this preferred embodiment, the coding of the tone in the block is performed by obtaining a median of the densities of eight picture elements adjacent to the block as a predictive value, computing a predictive error from the average density in the block and the predictive value, subjecting the predictive error to 15-step nonlinear quantization by using an exemplary quantization table as shown in FIG. 4.

When the attribute of the block is determined to be Label (2) in the block attribute determining section 151, the block is the semi-flat portion where the density variation is not flat but gentle. In this case, two-tone approximation is applied to the block in the two-tone block truncation coding section 153. The coding by the section 153 includes obtaining tone information X0 and X1 as two typical values of the densities and resolution information $S_{IJ}$ indicating which of the two typical values represents the approximation of the density of each picture element. The resolution information may be obtained by utilizing the information used in the determination of the block attribute. More specifically, the resolution information of the semi-flat portion may be obtained by binary-coding the information obtained in step 305 in FIG. 3 (step 311).

1) Coding of Resolution Information

The semi-flat portion is an area having a binary density distribution, and it mainly shows a base portion or a sharp edge of the density variation.

The binary density distribution according to the resolution information has a vertical, horizontal, or oblique character stroke pattern in many cases, and scarcely has a checkered pattern. This fact shows that there is a dependent relationship between rasters when the block is divided by the rasters. In this preferred embodiment, the coding is performed every raster by generating variable-length codes from a probability table utilizing a simple Markov process.

2) Coding of Tone Information (Density Information)

The tone information X0 is obtained as an average density of the high-density portion in the block, and the tone information X1 is obtained as an average density of the low-density portion in the block. In this preferred embodiment, the Huffman coding is performed by obtaining a median of the densities of picture elements adjacent to each density portion as a predictive value and computing a predictive error from the average density in each density portion and the predictive value. The codes in the Huffman coding are composed of 19 kinds of make-up codes and 27 kinds of terminate codes, so as to enable the representation of data of −256 to 256.

Figure 5A:
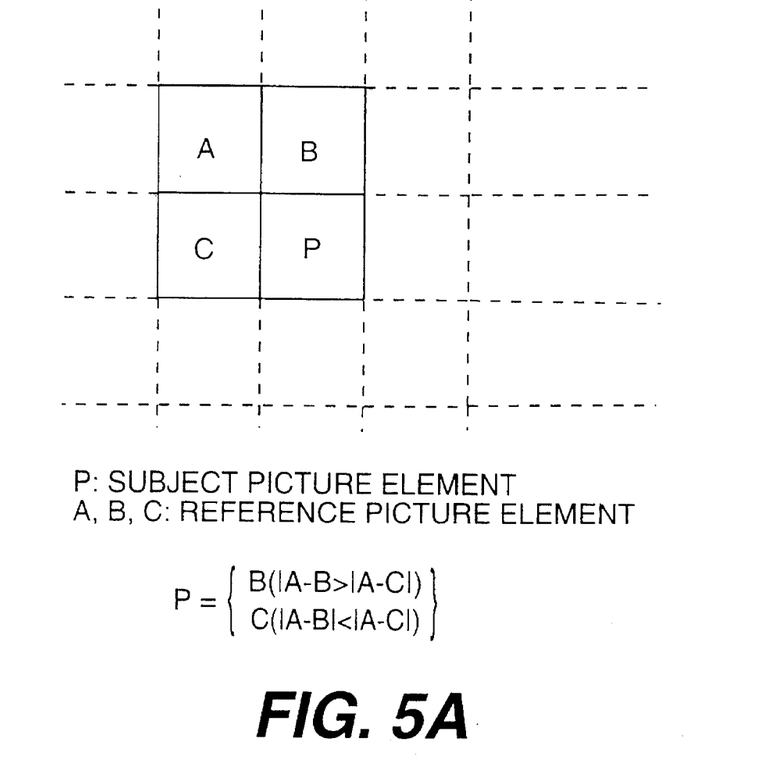
FIG. 5A is a schematic diagram illustrating the detection of an edge in the preferred embodiment.
Figure 5B:
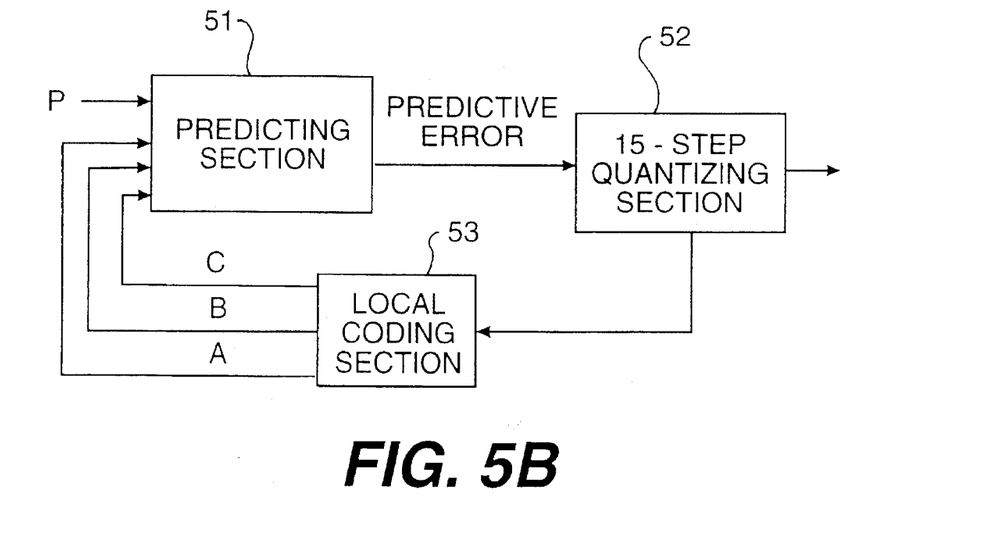
FIG. 5B is a block diagram of a predictive coding section shown in FIG. 1.

When the attribute of the block is determined to be Label (3), the block is the edge portion where the density variation is steep. The coding of the edge portion by the predictive coding section 154 includes obtaining a predictive error for every picture element in the block and performing 15-step quantization of the predictive error. As shown in FIG. 5B, the predictive coding section 154 comprises a predicting section 51, a 15-step quantizing section 52, and a local decoding section 53.

The predicting section 51 functions to detect an edge of character and obtain a predictive error for every picture element in the block. Referring to FIG. 5A, the detection of the edge is performed by first selecting a subject picture element P and setting three reference picture elements A, B, and C around the subject picture element P. Then, the density differences between A and B and between A and C are obtained, and the absolute values of the density differences obtained above, i.e., |A−B| and |A−C|, are compared with each other. As the result of comparison, if |A−B|>|A−C|, the density of the reference picture element B is set to a predictive value, while if |A−B|<|A−C|, the density of the reference picture element C is set to a predictive value. Then, the difference between the density of the subject picture element P and the predictive value set above is obtained, and is output as a predictive error to the quantizing section 52.

The quantizing section 52 functions to perform 15-step quantization of the predictive error on the basis of the quantization table as shown in FIG. 4, thus coding the predictive error. The local decoding section 53 functions to perform local decoding of the coded predictive error signal including a quantization error and apply the decoded signal to the reference picture elements A, B, and C, thereby effecting similar determination also in decoding. Accordingly, it is unnecessary to inform to the decoding section which of the reference picture elements B and C has been used for the predictive value.

According to the predictive coding by the predictive coding section 154, the edge is detected and the predictive value is decided, so that the accuracy of prediction can be made high and the predictive error can be greatly reduced.

Figure 6:
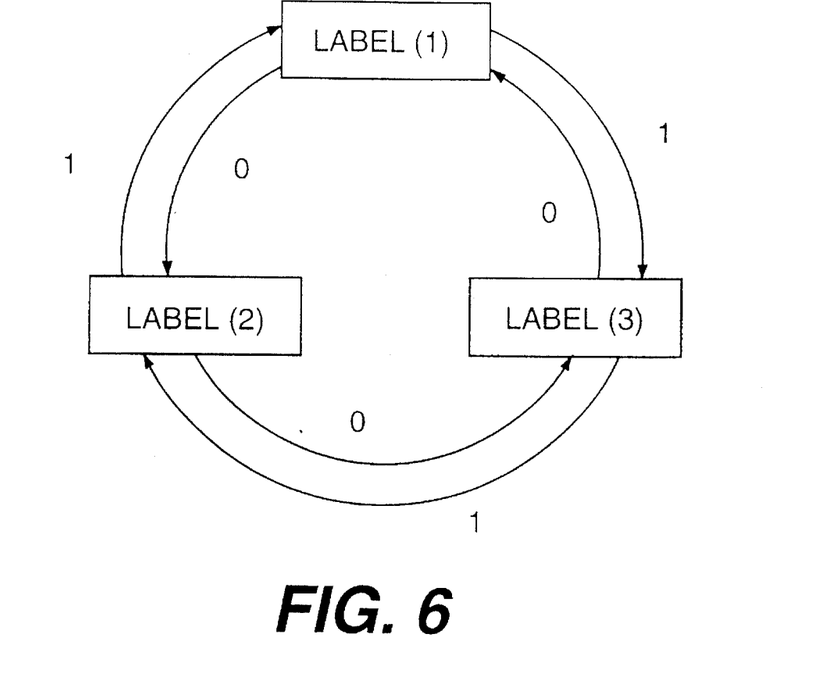
FIG. 6 is a schematic diagram illustrating a rule for ternary-extended MMR coding in the preferred embodiment.

The block attribute information determined by the block attribute determining section 151 is coded by the ternary-extended MMR coding section 155, in which MMR coding is extended to three values. More specifically, it is impossible that the present block attribute of three values after change is the same as the previous block attribute. In view of this fact, the attribute after change is represented by providing a certain rule for the remaining two block attributes and giving change information of one bit to a change point. FIG. 6 shows such a rule, in which a change from one of the three block attributes to either of the remaining two block attributes is allocated to a binary digit 1 or 0.

Figure 7:
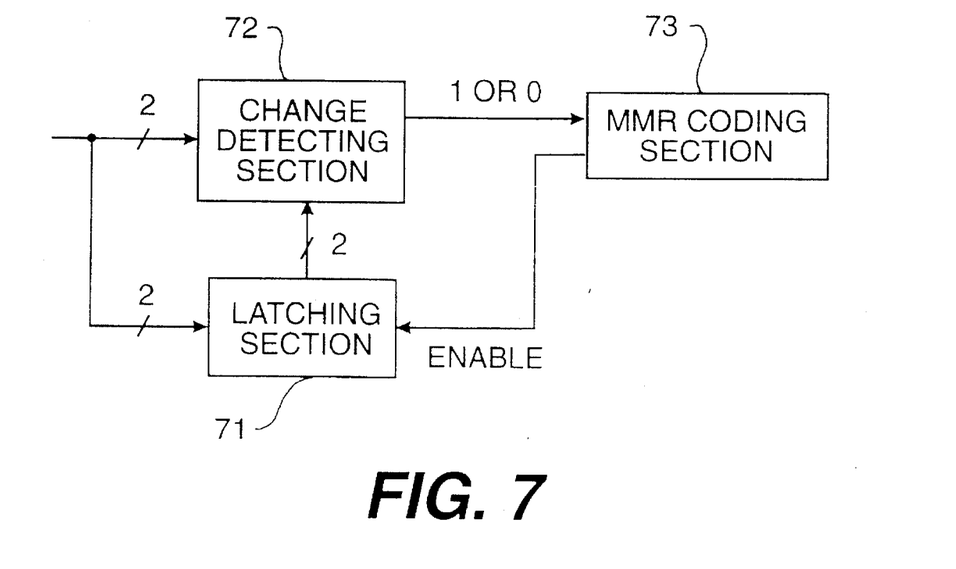
FIG. 7 is a block diagram of a ternary-extended MMR coding section shown in FIG. 1.

Referring to FIG. 7, there is shown a construction of the ternary-extended MMR coding section 155. The coding section 155 comprises a latching section 71 for storing block attribute information at a change point, a change detecting section 72 for detecting a change in block attribute according to the contents in the latching section 71 and the block attribute information input, and for coding this change with one bit, and an MMR coding section 73 for MMR coding an output from the change detecting section 72.

The change detecting section 72 functions to compare the contents in the latching section 71 with the block attribute information input. As the result of comparison, if the contents are different from the block attribute information input (i.e., if a change has occurred), the direction of the change is coded as state change indicating information of one bit.

Figure 8:
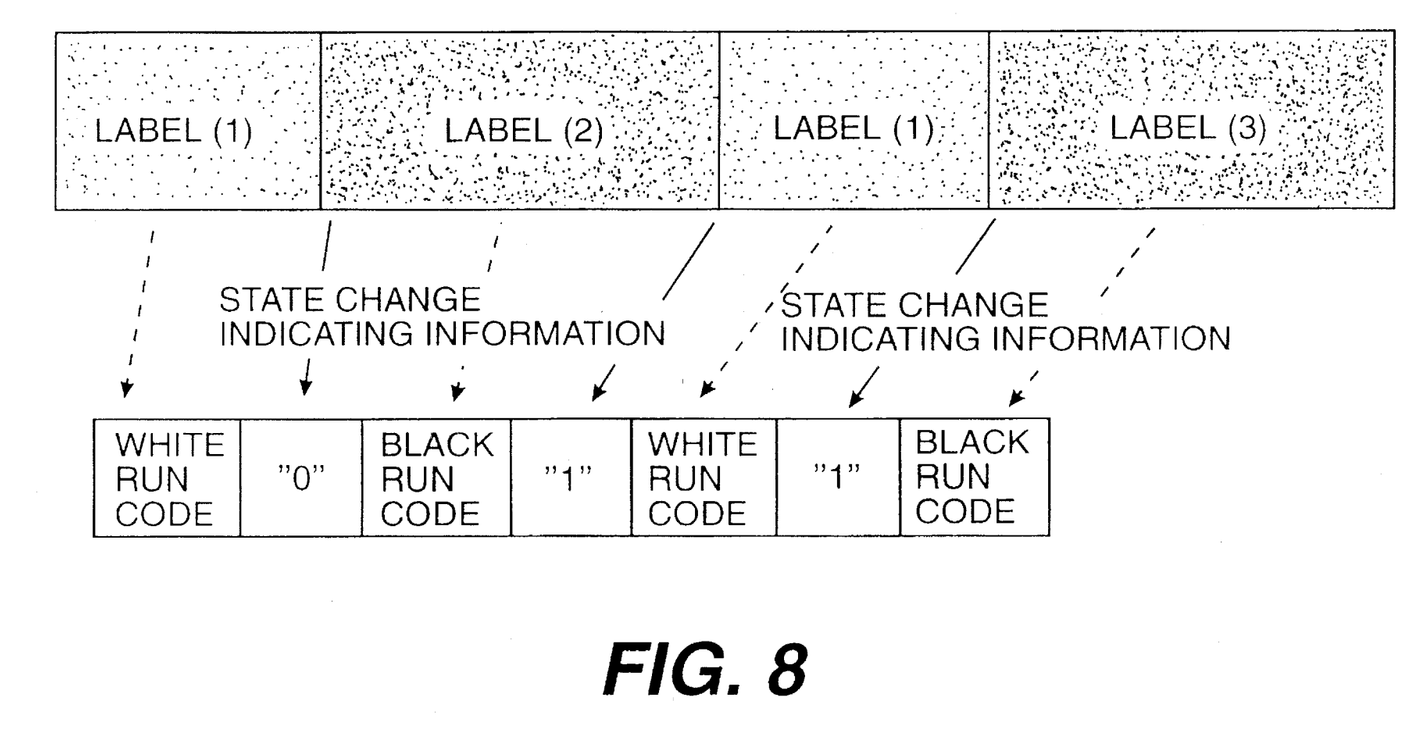
FIG. 8 is a schematic diagram illustrating the operation of the ternary-extended MMR coding section.

The MMR coding section 73 functions to allocate a white run code in the MMR coding to Label (1) (the flat portion) and allocate a black run code in the MMR coding to Label (2) (the semi-flat portion) and Label (3) (the edge portion), for example. The block attribute information thus represented by the two values is coded by the MMR coding method. The state change indicating information coded by the change detecting section 72 is added to the head of the binary-coded data obtained by the MMR coding section 73. Thus, a ternary condition is informed to the decoding section. An example of the operation of the MMR coding section 73 is shown in FIG. 8.

The code assembling section 156 functions to assemble the block attribute coded information output from the ternary-extended MMR coding section 155, the one-tone coded information of the block (the flat portion) output from the one-tone block truncation coding section 152, the two-tone coded information of the block (the semi-flat portion) output from the two-tone block truncation coding section 153, and the predictive picture element density coded information of the block (the edge portion) output from the predictive coding section 154. A header indicating a position, size, etc. of the image information is added to the assembly of these pieces of coded information.

Finally, the character image thus coded and output from the code assembling section 156 is stored into the storing section 25.

The halftone area coding section 12 may adopt an arbitrary coding method adaptable to the statistical property of the halftone area. For example, the coding method disclosed in Japanese Patent Laid-open Publication No. 4-144485 previously proposed by the present inventors may be adopted. As this method is known, the explanation thereof will be omitted.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An image processing device comprising:

blocking means for dividing an input image into a plurality of blocks each consisting of N1×N2 (N1, N2: positive integers) picture elements;

block attribute determining means for determining an attribute of each of said blocks obtained by said blocking means, said attribute being defined as one of a flat portion having substantially no density variation in said each block, a semi-flat portion having a binary density distribution in said each block, and an edge portion having a steep density variation in said each block;

first coding means for coding said each block by one-tone block truncation when said attribute is determined as said flat portion by said block attribute determining means, said first coding means representing said picture elements by one density value within a range of density values of said picture elements and coding said one density value;

second coding means for coding said each block by two-tone block truncation when said attribute is determined as said semi-flat portion by said block attribute determining means, said second coding means representing picture elements of a higher density group by a first density value within a range of densities of said picture elements of said higher density group, representing picture elements of a lower density group by a second density value within a range of densities of said picture elements of said lower density group, and coding said first density value and second density value;

third coding means for coding said each block by prediction of densities of said picture elements when said attribute is determined as said edge portion by said block attribute determining means;

fourth coding means for coding said attribute determined by said block attribute determining means; and code assembling means for assembling codes obtained by said first, second, third, and fourth coding means.

2. The image processing device as defined in claim 1, wherein said first coding means approximates an average of densities of said picture elements in said each block to a single tone.

3. The image processing device as defined in claim 1, wherein said second coding means approximates averages of densities of said picture elements in a high-density portion and a low-density portion of said each block to two tones.

4. The image processing device as defined in claim 1, wherein said third coding means performs adaptive predictive coding by detecting an edge direction and selecting one of said picture elements to be used for said prediction according to said edge direction detected above.

5. The image processing device as defined in claim 1, wherein said fourth coding means comprises:

means for converting ternary block attribute information into binary information by monitoring a change of said ternary block attribute information and by representing said change by said binary information; and means for compressing and coding said binary information.

6. The image processing device as defined as in claim 1, wherein said one density value is and an average value of said densities of said picture elements within said each block, said first density value is an average of said densities of said picture elements of said higher group, and said second density value is an average value of said densities of said picture elements of said lower group.

\* \* \* \* \*

UNITED STATES PATENT AND TRADEMARK OFFICE
CERTIFICATE OF CORRECTION

PATENT NO. : 5,524,067
DATED : June 04, 1996
INVENTOR(S) : Hidetaka MIYAKE et al.

It is certified that error appears in the above-indentified patent and that said Letters Patent is hereby corrected as shown below:

Claim 6, Column 8, Line 55, after "value is", delete "and".

Signed and Sealed this

Thirteenth Day of May, 1997

Attest:

BRUCE LEHMAN

Attesting Officer

Commissioner of Patents and Trademarks